US006867158B2

(12) United States Patent
Peuchert et al.

(10) Patent No.: US 6,867,158 B2
(45) Date of Patent: *Mar. 15, 2005

(54) FLAT PANEL LIQUID-CRYSTAL DISPLAY SUCH AS FOR A LAPTOP COMPUTER

(75) Inventors: Ulrich Peuchert, Mainz (DE); Peter Brix, Mainz (DE)

(73) Assignee: Schott Glas, Mainz (DE)

( * ) Notice: Subject to any disclaimer, the term of this patent is extended or adjusted under 35 U.S.C. 154(b) by 293 days.

This patent is subject to a terminal disclaimer.

(21) Appl. No.: 09/758,903

(22) Filed: Jan. 11, 2001

(65) Prior Publication Data

US 2001/0034293 A1 Oct. 25, 2001

(30) Foreign Application Priority Data

Jan. 12, 2000 (DE) .......................... 100 00 837

(51) Int. Cl.[7] .............................................. C03C 3/093
(52) U.S. Cl. ............................. 501/67; 501/65; 501/66
(58) Field of Search ...................... 501/65–67

(56) References Cited

U.S. PATENT DOCUMENTS

| | | | |
|---|---|---|---|
| 4,824,808 A | 4/1989 | Dumbaugh, Jr. | |
| 5,374,595 A | 12/1994 | Dumbaugh, Jr. et al. | |
| 5,770,535 A | 6/1998 | Brix et al. | |
| 5,908,703 A | 6/1999 | Brix et al. | |
| 6,169,047 B1 * | 1/2001 | Nishizawa et al. | 501/66 |
| 6,417,124 B1 * | 7/2002 | Peuchert et al. | 501/66 |
| 6,465,381 B1 * | 10/2002 | Lautenschlager et al. | 501/67 |
| 6,468,933 B1 * | 10/2002 | Narita et al. | 501/56 |

FOREIGN PATENT DOCUMENTS

| | | |
|---|---|---|
| DE | 3730410 | 4/1988 |
| DE | 4213579 | 10/1992 |
| DE | 19601022 | 7/1997 |
| DE | 19601922 | 7/1997 |
| EP | 0341313 | 6/1993 |
| EP | 0672629 | 9/1995 |
| EP | 0714862 | 6/1996 |
| EP | 0953549 | 11/1999 |
| EP | 1070681 | 1/2001 |
| EP | 1078893 | 2/2001 |
| JP | 61132536 | 6/1986 |
| JP | 4160030 | 6/1992 |
| JP | 8295530 | 11/1996 |
| JP | 9012333 | 1/1997 |
| JP | 948632 | 2/1997 |
| JP | 971192 | 4/1997 |
| JP | 9100135 | 4/1997 |
| JP | 9711919 | 4/1997 |
| JP | 9156953 | 6/1997 |
| JP | 9169538 | 6/1997 |
| JP | 9263421 | 10/1997 |
| JP | 1045422 | 2/1998 |
| JP | 1059741 | 3/1998 |
| JP | 1072237 | 3/1998 |
| JP | 10114538 | 5/1998 |
| JP | 10130034 | 5/1998 |
| JP | 10139467 | 5/1998 |
| JP | 10231139 | 9/1998 |
| JP | 10324526 | 12/1998 |
| JP | 1143350 | 2/1999 |
| JP | 1149520 | 2/1999 |
| WO | 9827019 | 6/1998 |

OTHER PUBLICATIONS

Database WPI Section Ch. Week 199717 Derwent Publications Ltd., London, GB; AN 1997–188222 XP002168035 & JP 09 048632 A (Nippon Electric Glass Co), Feb. 18, 1997.
Database WPI Section Ch, Week 199734 Derwent Publications Ltd:, London GB; AN 1997–369217 XP002168036 & JP 09 156953 A (Nippon Electric Glass Co.), Jun. 17, 1997.
Database WPI Section Ch, Week 200040 Derwent Publications Ltd., London, GB; AN 2000–45638 XP002168037 & JP 2000 159541 A (Nippon Electric Glass Co), Jun. 13, 2000.

* cited by examiner

Primary Examiner—Karl Group
Assistant Examiner—Elizabeth A. Bolden
(74) Attorney, Agent, or Firm—Nils H. Ljungman & Associates

(57) ABSTRACT

Flat panel liquid-crystal displays, such as for laptop computers. The displays include twisted nematic displays, supertwisted nematic displays, active matrix liquid-crystal displays, thin film transistor displays, and plasma addressed liquid-crystal displays. The displays are furnished with glass substrates. The glass substrates exhibit high resistance to thermal shock, a high transparency over a broad spectral range in the visible and ultra violet ranges and the glass being configured to be free of bubbles, knots, inclusions, streaks, and surface undulations, which glass substrates are made from alkali-free aluminoborosilicate glasses. There are also provided analogous thin-film photovoltaics.

3 Claims, No Drawings

FLAT PANEL LIQUID-CRYSTAL DISPLAY SUCH AS FOR A LAPTOP COMPUTER

CROSS-REFERENCE TO RELATED PATENT APPLICATIONS

This application is related to application Ser. No. 09/758,919, filed concurrently herewith on Jan. 11, 2001, having the title ALKALI-FREE ALUMINOBOROSILICATE GLASS, AND USES THEREOF, naming as inventors Dr. Ulrich PEUCHERT and Dr. Peter BRIX.

This application is also related to application Ser. No. 09/758,952, filed concurrently herewith on Jan. 11, 2001, having the title ALKALI-FREE ALUMINOBOROSILICATE GLASS, AND USES THEREOF, naming as inventors Dr. Ulrich PEUCHERT and Dr. Peter BRIX.

This application is further related to application Ser. No. 09/758,946, filed concurrently herewith on Jan. 11, 2001, having the title ALKALI-FREE ALUMINOBOROSILICATE GLASS, AND USES THEREOF, naming as inventors Dr. Ulrich PEUCHERT and Dr. Peter BRIX.

BACKGROUND OF THE INVENTION

1. Field of the Invention

The invention relates to alkali-free aluminoborosilicate glasses. The invention also relates to uses of these glasses.

2. Background of the Invention

High requirements are made of glasses for applications as substrates in flat-panel liquid-crystal (or expressed differently: liquid crystal) display technology, for example in TN (twisted nematic)/STN (supertwisted nematic, or expressed differently: super twisted nematic) displays, active matrix liquid crystal displays (AMLCDs), thin-film transistors (TFTs) or plasma addressed liquid crystals (PALCs). Besides high thermal shock resistance and good resistance to the aggressive chemicals employed in the process for the production of flat-panel screens, the glasses should have high transparency over a broad spectral range (VIS, UV) and, in order to save weight, a low density. Use as substrate material for integrated semiconductor circuits, for example in TFT displays ("chip on glass") in addition requires thermal matching to the thin-film material silicon which is usually deposited on the glass substrate in the form of amorphous silicon (a-Si) at low temperatures of up to 300° C. The amorphous silicon is partially recrystallized by subsequent heat treatment at temperatures of about 600° C. Owing to the a-Si fractions, the resulting, partially crystalline poly-Si layer is characterized by a thermal expansion coefficient of $\alpha_{20/300} \cong 3.7 \times 10^{-6}/K$. Depending on the a-Si/poly-Si ratio, the thermal expansion coefficient $\alpha_{20/300}$ may vary between $2.9 \times 10^{-6}/K$ and $4.2 \times 10^{-6}/K$. When substantially crystalline Si layers are generated by high temperature treatments above 700° C. or direct deposition by CVD processes, which is likewise desired in thin-film photovoltaics, a substrate is required which has a significantly reduced thermal expansion of $3.2 \times 10^{-6}/K$ or less.

In addition, applications in display and photovoltaics technology require the absence of alkali metal ions. Sodium oxide levels of less than 1000 ppm (parts per million) as a result of production can be tolerated in view of the generally "poisoning" action due to diffusion of $Na^+$ into the semiconductor layer.

It should be possible to produce suitable glasses economically on a large industrial scale in adequate quality (no bubbles, knots, inclusions), for example in a float plant or by drawing methods. In particular, the production of thin (>1 mm) streak-free substrates with low surface undulation by drawing methods requires high devitrification stability of the glasses. Compaction of the substrate during production, in particular in the case of TFT displays, which has a disadvantageous effect on the semiconductor microstructure, can be countered by establishing a suitable temperature-dependent viscosity characteristic line of the glass: with respect to thermal process and shape stability, it should have a sufficiently high glass transition temperature $T_g$, i.e. $T_g > 700°$ C., while on the other hand not having excessively high melting and processing ($V_A$) temperature, i.e. a $V_A$ of ≤ 1350° C.

The requirements of glass substrates for LCD display technology or thin-film photovoltaics technology are also described in "Glass substrates for AMLCD applications: properties and implications" by J. C. Lapp, SPIE Proceedings, Vol. 3014, invited paper (1997), and in "Photovoltaik—Strom aus der Sonne" by J. Schmid, Verlag C. F. Müller, Heidelberg 1994, respectively.

The abovementioned requirement profile is fulfilled best by alkaline earth metal aluminoborosilicate glasses. However, the known display or solar cell substrate glasses described in the following publications still have disadvantages and do not meet the full list of requirements:

Numerous documents describe glasses having low MgO contents: JP 9-169 538 A, JP 4-160 030 A, JP 9-100 135 A, EP 714 862 A1, EP 341 313 B1, U.S. Pat. No. 5,374,595, WO 97/11919 and WO 97/11920. Such glasses, in particular those of EP 714 862 A1 and JP 9-169538 A, do not have the desired meltability, as is evident from very high temperatures at viscosities of $10^2$ dPas and $10^4$ dPas, and have a relatively high density. The same applies to the MgO-free glasses of DE 37 30 410 A1.

The glasses of U.S. Pat. No. 5,374,595 have high BaO contents of 2–7 mol % which leads to undesirably high densities of these glasses. The same applies to the glasses of JP 61-132536 A, JP 8-295530 A, JP 9-48632 A and JP 9-156953 A.

Similarly, the glasses of JP 10-72237 A having high SrO contents have very high temperatures at viscosities of $10^2$ dPas and $10^4$ dPas, as is evident from the examples.

The same is true for glasses having low $B_2O_3$ contents as described in JP 9-263421 A and JP 10-45422 A. The devitrification tendency will be disadvantageously high, in particular in combination with low BaO contents. On the other hand, excessively high $B_2O_3$ contents—such glasses are described, for example, in U.S. Pat. No. 4,824,808—are disadvantageous for the intended properties of high heat resistance and high chemical resistance, in particular to hydrochloric acid solutions.

Low-$SiO_2$ glasses do not have sufficient chemical resistance either, in particular when they contain relatively large amounts of $B_2O_3$ and are low in alkaline earth metals. This applies to the glasses of WO 97/11919 and EP 672 629 A2. The relatively $SiO_2$-rich variants of the latter document have only low $Al_2O_3$ levels, which is disadvantageous for the crystallization behavior.

JP 9-123 33 A, which relates to glasses for hard disks, describes compositions of $SiO_2$, $Al_2O_3$, CaO and further optional components including $B_2O_3$. The glasses listed have high alkaline earth metal oxide contents and thus have high thermal expansion, which makes them unsuitable for use in LCD or PV technology. Their visual quality will probably also be inadequate.

Federal Republic of Germany Patent No. 196 17 344 C1 (U.S. Pat. No. 5,908,703) and Federal Republic of Germany Patent No. 196 03 698 C1 (U.S. Pat. No. 5,770,535) by the Applicant disclose alkali-free, tin oxide-containing, low-$SiO_2$ or SrO-free glasses having a coefficient of thermal expansion $\alpha_{20/300}$ of about $3.7 \cdot 10^{-6}$/K and very good chemical resistance. They are suitable for use in display technology. However, since they must contain ZnO, they are not ideal, in particular for processing in a float plant. In particular at higher ZnO contents (>1.5% by weight), there is a risk of formation of ZnO coatings on the glass surface by evaporation and subsequent condensation in the hot-shaping range.

WO 98/27019 describes glasses for display and photovoltaics applications having a low density and a high heat resistance. In these glasses, some of which have a high CaO content, the SrO and BaO contents are limited to a total of 3% by weight, which renders the glasses susceptible to crystallization.

DE 196 01 022 A1 describes glasses which are selected from a very wide composition range and which must contain $ZrO_2$ and SnO. The glasses, which, according to the examples, have a relatively high BaO content, tend to exhibit glass defects because of the $Zro_2$ level which has to be present.

DE 42 13 579 A1 describes glasses for TFT applications having a coefficient of thermal expansion $\alpha_{20/300}$ of $<5.5 \times 10^{-6}$/K, according to the examples of $\geq 4.0 \times 10^{-6}$/K. These glasses which have relatively high $B_2O_3$ levels and relatively low $SiO_2$ contents do not have a high chemical resistance, in particular to diluted hydrochloric acid.

In the unexamined Japanese publications JP 10-25132 A, JP 10-114538 A, JP 10-130034 A, JP 10-59741 A, JP 10-324526 A, JP 11-43350 A, JP 11-49520 A, JP 10-231139 A and JP 10-139467 A, mention is made of very wide composition ranges for display glasses, which can be varied by means of many optional components and which are admixed with one or more specific refining agents in each case. However, these documents do not indicate how glasses having the complete requirement profile described above can be obtained in a specific manner.

OBJECT OF THE INVENTION

It is an object of the present invention to provide glasses which meet said physical and chemical requirements imposed on glass substrates for liquid-crystal displays, in particular for TFT displays, and for thin-film solar cells, in particular on the basis of $\mu$c-Si, glasses which have high heat resistance, a favorable processing range and sufficient devitrification stability.

SUMMARY OF THE INVENTION

The invention teaches that this object can be achieved by aluminoborosilicate glasses having a coefficient of thermal expansion $\alpha_{20/300}$ of between $2.8 \times 10^{-6}$/K and $3.8 \times 10^{-6}$/K, which has the following composition (in % by weight, based on oxide): silicon dioxide ($SiO_2$)–from more than 58% to 65% (>58%–65%); boric oxide ($B_2O_3$)–from somewhat more than 6% to 11.5% (>6%–11.5%); aluminum oxide ($Al_2O_3$)–from more than 14% to 25% (>14%–25%); magnesium oxide (MgO) from 4% to 8% (4%–8%); calcium oxide (CaO)–from 0% to 8% (0%–8%); strontium oxide (SrO)–from 2.6% to somewhat less than 4% (2.6%–4%); barium oxide (BaO)–from 0% to somewhat less than 0.5% (0%–<0.5%); with strontium oxide (SrO)+barium oxide (BaO)–more than 3% (>3%); and zinc oxide (ZnO)–from 0% to 2% (0%–2%)

The invention also teaches the alkali-free aluminoborosilicate glasses having a coefficient of thermal expansion $\alpha_{20/300}$ of between $2.8 \times 10^{-6}$/K and $3.8 \times 10^{-6}$/K, which has the following composition (in % by weight, based on oxide): silicon dioxide ($SiO_2$)–more than 58% to 65% (>58%–65%); boric oxide ($B_2O_3$)–from somewhat more than 6% to 11.5% (>6%–11.5%); aluminum oxide ($Al_2O_3$) from somewhat more than 14% to 25% (>14%–25%); magnesium oxide (MgO)–from 4% to 8% (4%–8%); calcium oxide (CaO)–from 0% to somewhat less than 2% (0%–<2%); strontium oxide (SrO)–from somewhat more than 0.5% to somewhat less than 4% (>0.5%–<4%); barium oxide (BaO)–from 0% to less than 0.5% (0%–<0.5%); and zinc oxide (ZnO)–from 0% to 2% (0%–2%).

The invention also teaches the alkali-free aluminoborosilicate glasses having a coefficient of thermal expansion $\alpha_{20/300}$ of between $2.8 \times 10^{-6}$/K and $3.6 \times 10^{-6}$/K, which has the following composition (in % by weight, based on oxide): silicon dioxide ($SiO_2$)–from more than 58% to 65% (>58%–65%); boric oxide ($B_2O_3$)–from more than 6% to 11.5% (>6%–11.5%); aluminum oxide ($Al_2O_3$)–from more than 21% to 25% (>21%–25%); magnesium oxide (MgO)–from 4% to 8% (4%–8%); calcium oxide (CaO)–from 0% to 8% (0%–8%); strontium oxide (SrO)–from 2.6% to somewhat less than 8% (2.6%–<8%); barium oxide (BaO)–from 0% to somewhat less than 0.5% (0%–<0.5%); with strontium oxide (SrO)+barium oxide (BaO)–more than 3% (>3%); and zinc oxide (ZnO)–from 0% to 2% (0%–2%).

The glasses contain from >58 to 65% by weight of $SiO_2$. At a lower content, the chemical resistance is impaired, while at a higher content, the thermal expansion is too low and the crystallization tendency of the glass increases. Preference is given to a content of up to 64.5% by weight of $SiO_2$.

The glasses contain from >14 to 25% by weight of $Al_2O_3$. $Al_2O_3$ has a positive effect on the heat resistance of the glasses without excessively increasing the processing temperature. At a lower content, the glasses become more susceptible to crystallization. Preference is given to a content of more than 14.5% by weight of $Al_2O_3$, particularly preferably more than 18% by weight of $Al_2O_3$, most preferably of at least 20.5% by weight of $Al_2O_3$, in particular of at least 21% by weight of $Al_2O_3$. Preference is given to a maximum $Al_2O_3$ content of 24% by weight.

The $B_2O_3$ content is restricted to a maximum of 11.5% by weight in order to achieve a high glass transition temperature $T_g$. Higher contents would also impair the chemical resistance. Preference is given to a maximum $B_2O_3$ content of 11% by weight. The $B_2O_3$ content is higher than 6% by weight to ensure that the glasses have good meltability and good crystallization stability. Preference is given to a minimum content of more than 8% by weight.

The network-forming components $Al_2O_3$ and $B_2O_3$ are preferably present at mutually dependent minimum levels, ensuring a preferred content of the network formers $SiO_2$, $Al_2O_3$ and $B_2O_3$. For example, in the case of a minimum $B_2O_3$ content of >6% by weight, the minimum $Al_2O_3$ content is preferably >18% by weight, and in the case of a minimum $Al_2O_3$ content of >14% by weight, the minimum $B_2O_3$ content is preferably >8% by weight.

The sum of $SiO_2$, $Al_2O_3$ and $B_2O_3$ is preferably between 83 and 91% by weight.

An essential glass component are the network-modifying alkaline earth metal oxides. In particular by varying their levels, a coefficient of thermal expansion $\alpha_{20/300}$ of between $2.8 \times 10^{-6}$/K and $3.8 \times 10^{-6}$/K is achieved. The individual oxides are present in the following proportions:

The glasses contain from 4 to 8% by weight of MgO. A high MgO level has a positive effect on the desired properties of low density and low processing temperature, whereas a rather low level favors crystallization stability and chemical resistance.

The glasses may contain up to 8% by weight of CaO. Higher levels would lead to an excessive increase in thermal expansion and a decrease in crystallization stability. For glasses exhibiting a particularly low thermal expansion, i.e. in particular for glasses having coefficients of thermal expansion $\alpha_{20/300}$ of up to $3.4\times10^{-6}$/K, the CaO content is preferably limited to a maximum of <2% by weight.

Another optional constituent is BaO, its maximum content being limited to less than 0.5% by weight. This ensures good meltability and keeps the density low. The glass is preferably BaO-free.

The glass contains up to <4% by weight of the relatively heavy alkaline earth metal oxide SrO. Limitation to this low maximum content is especially advantageous for a low density of the glass.

When the minimum Bum of SrO and BaO is more than 3% by weight in order to ensure sufficient crystallization stability, in particular with rather CaO-rich compositions, the minimum SrO content is 2.6% by weight.

In the case of low-CaO and CaO-free variants, in particular at CaO contents of between 0 and <2% by weight, a minimum SrO content of at least >0.5% by weight is sufficient. In the case of these glasses, the sum of SrO and BaO is preferably at least 1% by weight, particularly preferably at least >1% by weight.

In the case of high $Al_2O_3$ contents, i.e. contents of >21% by weight, the SrO content can be varied within wider limits, between 2.6 and <8% by weight. As a result of, in particular, the high-SrO contents which have now become possible, particularly crystallization-stable glasses having sufficiently low densities are obtained. In the case of these glasses, the minimum sum of SrO and BaO is likewise >3% by weight. These glasses have coefficients of thermal expansion $\alpha_{20/300}$ of between $2.8\times10^{-6}$/K and $3.6\times10^{-6}$/K.

The glasses may contain up to 2% by weight of ZnO, preferably <2% by weight of ZnO. The network modifier ZnO has a structure-loosening function and has less effect on the thermal expansion than the alkaline earth metal oxides. Its effect on the viscosity characteristic line is similar to that of $B_2O_3$. In particular in the case of processing of the glasses by the float process, the ZnO level is preferably limited to a maximum of 1.5% by weight. Higher levels would increase the risk of unwanted ZnO coatings on the glass surface which may form by evaporation and subsequent condensation in the hot-shaping range.

The glasses are alkali-free. The term "alkali-free" as used herein means that they are essentially free from alkali metal oxides, although they can contain impurities of less than 1000 ppm (parts per million).

The glasses may contain up to 2% by weight of $ZrO_2+TiO_2$, where both the $TiO_2$ content and the $ZrO_2$ content can each be up to 2% by weight. $ZrO_2$ advantageously increases the heat resistance of the glasses. Owing to its low solubility, $ZrO_2$ does, however, increase the risk of $ZrO_2$-containing melt relicts, so-called zirconium nests, in the glass. $ZrO_2$ is therefore preferably omitted. Low $Zro_2$ contents originating from corrosion of zirconium-containing trough material are entirely unproblematic. $TiO_2$ advantageously reduces the solarization tendency, i.e. the reduction in transmission in the visible wavelength region because of UV-VIS radiation. At contents of greater than 2% by weight, color casts can occur due to complex formation with $Fe^{3+}$ ions which are present in the glass at low levels as a result of impurities of the raw materials employed.

The glasses may contain conventional refining agents in the usual amounts: they may thus contain up to 1.5% by weight of $As_2O_3$, $Sb_2O_3$, $SnO_2$ and/or $CeO_2$. It is likewise possible to add 1.5% by weight each of $Cl^{31}$ (for example in the form of $BaCl_2$), $F^-$ (for example in the form of $CaF_2$) or $SO_4^{2-}$ (for example in the form of $BaSO_4$). The sum of $As_2O_3$, $Sb_2O_3$, $CeO_2$, $SnO_2$, $Cl^-$, $F^-$ and $SO_4^{2-}$ should, however, not exceed 1.5% by weight.

If the refining agents $As_2O_3$ and $Sb_2O_3$ are omitted, these glasses can be processed not only using a variety of drawing methods, but also by the float method.

For example with regard to easy batch preparation, it is advantageous to be able to omit both $ZrO_2$ and $SnO_2$ and still obtain glasses having the property profile mentioned above, in particular having high heat and chemical resistance and low crystallization tendency.

The above-discussed embodiments of the present invention will be described further hereinbelow. When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

DESCRIPTION OF THE PREFERRED EMBODIMENT

The invention is further described with reference to examples, i.e. working examples, as follows Working examples:

Glasses were produced in Pt/Ir crucibles at 1620° C. from conventional raw materials which were essentially alkali-free apart from unavoidable impurities. The melt was refined at this temperature for one and a half hours, then transferred into inductively heated platinum crucibles and stirred at 1550° C. for 30 minutes for homogenization.

The Table shows fourteen examples of glasses according to the invention with their compositions (in % by weight, based on oxide) and their most important properties. The refining agent $SnO_2$ (Examples 1, 2, 4, 5, 7, 8, 10–14) or $As_2O_3$ (Examples 3, 6, 9) at a level of 0.3% by weight is not listed. The following properties are given:

the coefficient of thermal expansion $\alpha_{20/3000}$ $[10^{-6}/K]$ the density $\rho [g/cm^3]$ the dilatometric glass transition temperature $T_g$ [° C] in accordance with DIN 52324 the temperature at a viscosity of $10^4$ dPas (referred to as T 4 [° C])

the temperature at a viscosity of $10^2$ dPas (referred to as T 2 [° C]), calculated from the Vogel-Fulcher-Tammann equation the refractive index $n_d$ the resistance to buffered hydrofluoric acid ("BHF") as weight loss (material removal value) from glass plates measuring 50 mm×50 mm×2 mm and polished on all sides after treatment with 10% strength $NH_4F.HF$ solution for 20 minutes at 23° C. $[mg/cm^2]$.

TABLE

Examples: Compositions (in % by weight, based on oxide) and essential properties of glasses according to the invention.

| | 1 | 2 | 3 | 4 | 5 | 6 | 7 |
|---|---|---|---|---|---|---|---|
| $SiO_2$ | 58.3 | 58.3 | 63.5 | 62.1 | 62.1 | 63.5 | 60.8 |
| $B_2O_3$ | 8.5 | 8.5 | 9.0 | 8.2 | 8.2 | 9.1 | 8.2 |
| $Al_2O_3$ | 21.5 | 21.5 | 16.5 | 19.0 | 19.0 | 17.3 | 16.1 |
| MgO | 4.5 | 6.0 | 4.5 | 6.0 | 7.5 | 6.0 | 4.1 |
| CaO | 3.4 | 1.9 | 3.0 | 1.5 | 1.5 | 1.8 | 7.0 |
| SrO | 3.5 | 3.5 | 3.2 | 2.0 | 1.0 | 2.0 | 3.5 |
| BaO | — | — | — | 0.4 | 0.4 | — | — |
| ZnO | — | — | — | 0.5 | — | — | — |
| $\alpha_{20/300}$ [$10^{-6}$/K] | 3.26 | 3.16 | 3.14 | 2.96 | 2.99 | 2.98 | 3.76 |
| $\rho$ [g/cm$^3$] | 2.48 | 2.47 | 2.43 | 2.45 | 2.44 | n.m. | 2.49 |
| $T_g$ [° C.] | 735 | 737 | 723 | 740 | 729 | 725 | 713 |
| T4 [° C.] | 1257 | 1273 | 1300 | 1283 | 1288 | 1289 | 1255 |
| T2 [° C.] | 1613 | 1621 | 1694 | 1657 | 1652 | 1653 | 1616 |
| $n_d$ | 1.522 | 1.522 | 1.513 | 1.516 | 1.516 | 1.520 | 1.524 |
| BHF [mg/cm$^2$] | 0.71 | 0.77 | 0.58 | 0.65 | 10.66 | 0.60 | 0.60 |
| | 8 | 9 | 10 | 11 | 12 | 13 | 14 |
| $SiO_2$ | 59.5 | 60.0 | 60.0 | 52.5 | 60.0 | 60.0 | 62.6 |
| $B_2O_3$ | 7.5 | 7.5 | 6.6 | 7.5 | 7.5 | 10.0 | 8.2 |
| $Al_2O_3$ | 21.5 | 21.5 | 22.5 | 18.5 | 18.5 | 16.0 | 14.5 |
| MgO | 4.5 | 4.1 | 6.0 | 4.5 | 5.6 | 4.2 | 4.2 |
| CaO | 0.4 | 3.5 | 1.1 | 3.2 | 4.2 | 6.0 | 6.7 |
| SrO | 6.0 | 2.7 | 3.5 | 3.5 | 3.9 | 3.5 | 3.5 |
| BaO | 0.3 | 0.4 | — | — | — | — | — |
| ZnO | — | — | — | — | — | — | — |
| $\alpha_{20/300}$ [$10^{-6}$/K] | 3.04 | 3.12 | 3.00 | 3.19 | 3.55 | 3.64 | 6.72 |
| $\rho$ [g/cm$^3$] | 2.49 | 2.47 | 2.48 | 2.46 | 2.40 | 2.47 | 2.47 |
| $T_g$ [° C.] | 742 | 746 | 753 | 730 | 730 | 700 | 705 |
| T4 [° C.] | 1287 | 1284 | 1286 | 1294 | 1253 | 1234 | 1252 |
| T2 [° C.] | 1654 | 1644 | 1641 | 1674 | 1615 | 1604 | 1627 |
| $n_d$ | 1.518 | 1.520 | 1.521 | 1.522 | 1.524 | 1.521 | 1.520 |
| BHF [mg/cm$^2$] | 0.81 | 0.66 | 0.75 | n.m. | n.m. | n.m. | 0.58 | n.m. = not measured

Furthermore, acid resistance was determined for the glasses of examples 3 and 14, i.e. the "HCl" acid resistance as weight loss (material removal value) from glass plates measuring 50 mm×50 mm×2 mm and polished on all sides after treatment with 5% strength hydrochloric acid for 24 hours at 95° C.: it was found to be 0.78 mg/cm$^2$ (glass no. 3) and 0.50 mg/cm$^2$ (glass no. 14), respectively.

As the working examples illustrate, the glasses according to the invention have the following advantageous properties:

- a thermal expansion $\alpha_{20/300}$ of between 2.8×10$^{-6}$/K and 3.8×10$^{-6}$/K, or between 2.8×10$^{-6}$/K and 3.6×10$^{-6}$/K, or up to 3.4×10$^{-6}$/K, respectively, thus matched to the expansion behavior of both amorphous silicon and increasingly polycrystalline silicon.
- $T_g$>700° C., a very high glass transition temperature, i.e. a high heat resistance. This is essential for the lowest possible compaction as a result of production and for use of the glasses as substrates for coatings with amorphous Si layers and their subsequent annealing.
- $\rho$<2.600 g/cm$^3$, a low density.
- a temperature at a viscosity of 10$^4$ dPas of at most 1350° C., and a temperature at a viscosity of 10$^2$ dPas of at most 1720° C., which means a suitable viscosity characteristic line with regard to hot-shaping and meltability. The glasses can be produced as flat glasses by the various drawing methods, for example microsheet down-draw, up-draw or overflow fusion methods, and, in a preferred embodiment, if they are free from $As_2O_3$ and $Sb_2O_3$, also by the float process.
- a high chemical resistance, as is evident from good resistance to buffered hydrofluoric acid solution, which makes them sufficiently inert to the chemicals used in the production of flat-panel screens.
- $n_d$≦1.526, a low refractive index. This property is the physical prerequisite for a high transmission.

The glasses have high thermal shock resistance and good devitrification stability.

The glasses are thus highly suitable for use as substrate glass in display technology, in particular for TFT displays, and in thin-film photovoltaics.

Alkali-free aluminoborosilicate glass in accordance with the present invention may, for example, have any value of coefficient of thermal expansion $\alpha_{20/300}$ in the range of between about 2.8×10$^{-6}$/K and about 3.8×10$^{-6}$/K, for example, 2.9×10$^{-6}$/K and 3.7×10$^{-6}$/K. Thus, the value of the coefficient of thermal expansion $\alpha_{20/300}$ is not limited to the first and final values of the range, but can comprise any value of coefficient of thermal expansion $\alpha_{20/300}$ between them.

The alkali-free aluminoborosilicate glasses in accordance with the present invention may, for example, have any value (in % by weight, based on oxide) of $SiO_2$ (silica, silicon dioxide) in the range of from about 58 to about 65, for example, 59 and 64. Thus, the value for $SiO_2$, in % by weight, based on oxide, is not limited to the first and final values of the range, but can comprise any value of $SiO_2$ between them.

The alkali-free aluminoborosilicate glasses in accordance with the present invention may, for example, have any value (in % by weight, based on oxide) of $B_2O_3$ (boric oxide) in the range of from about 6 to about 11.5, for example, 6.5 and 10. Thus, the value for $B_2O_3$, in % by weight, based on oxide, is not limited to the first and final values of the range, but can comprise any value of $B_2O_3$ between them.

Similarly, the alkali-free aluminoborosilicate glass in accordance with the present invention may, for example, have any value (in % by weight, based on oxide) of $Al_2O_3$ (alumina, aluminum oxide) in the range of from about 14 to about 25, for example, 15 and 24. Thus, the value for $Al_2O_3$, in % by weight, based on oxide, is not limited to the first and final values of the range, but can comprise any value of $Al_2O_3$ between them.

Thus, components of the composition of the alkali-free aluminoborosilicate glass in accordance with our invention are likewise not limited to the first and final values of the indicated range, but can comprise any value between them.

The expression "coefficient of thermal expansion $\alpha_{20/300}$" may indicate the fractional change in the length or volume of a body per degree of temperature change for the range of from 20 to 300 degrees Celsius.

The expression $\mu c$-Si is to mean in at least one embodiment of the invention: micro-crystalline silicon.

The expression thermal expansion coefficient or coefficient of thermal expansion ($\alpha_{20/300}$) in at least one embodiment of the invention is to mean: a nominal thermal coefficient ($\alpha$) as possibly applicable in the temperature range of from 20 to 300 in the Celsius scale, as possibly applicable in the context of the indicated data.

The expression glass transition temperature ($T_g$) in at least one embodiment of the invention is to mean: (1) the temperature below which a substance becomes superconducting; or (2) the temperature at which one polymorph changes into the next thermodynamically stable state; as the shown technical data suggest.

The density ($\rho$) is to mean in at least one embodiment of the invention: (1) the mass of a substance per unit of volume, expressed as kilograms per cubic meter, or expressed in smaller units, grams per cubic centimeter; or (2) the degree of opacity of a translucent material; as the technical data suggest.

The term DIN refers to the German Standard Organization "Deutsches Institute für Normung e.V., in Berlin, Germany, from which the numbered standards may be obtained.

The Vogel-Fulcher-Tammann equation is possibly related to the Fulcher equation meaning empirical in derivation; it relates glass viscosity to temperature: $\log\eta = -A + B/T - T_0$ where the temperature T is in degrees Celsius, A, B, and $T_0$ are material-specific constants.

The features disclosed in the various publications, disclosed or incorporated by reference herein, may be used in the embodiments of the present invention, as well as, equivalents thereof.

One feature of the invention resides broadly in the alkali-free aluminoborosilicate glass having a coefficient of thermal expansion $\alpha_{20/300}$ of between $2.8\times10^{-6}$/K and $3.8\times10^{-6}$/K, which has the following composition (in % by weight, based on oxide): $SiO_2$>58–65; $B_2O_3$>6–11.5; $Al_2O_3$>14–25; MgO 4–8; CaO 0–8; SrO 2.6–<4; BaO 0–<0.5: with SrO+BaO>3; ZnO 0–2.

Another feature of the invention resides broadly in the alkali-free aluminoborosilicate glass having a coefficient of thermal expansion $\alpha_{20/300}$ of between $2.8\times10^{-6}$/K and $3.4\times10^{-6}$/K, which has the following composition (in % by weight, based on oxide): $SiO_2$>58–65; $B_2O_3$>6–11.5; $Al_2O_3$>14–25; MgO 4–8; CaO 0–<2; SrO>0.5–<4; BaO 0<0.5; and ZnO 0–2.

Yet another feature of the invention resides broadly in the alkali-free aluminoborosilicate glass having a coefficient of thermal expansion $\alpha_{20/300}$ of between $2.8\times10^{-6}$/K and $3.6\times10^6$/K, which has the following composition (in % by weight, based on oxide): $SiO_2$>58–65; $B_2O_3$>6–11.5; $Al_2O_3$>21–25; MgO 4–8; CaO 0–8; SrO 2.6–<8; BaO 0–<0.5; with SrO+BaO>3; and ZnO 0–2.

Still another feature of the invention resides broadly in the aluminoborosilicate glass characterized in that it comprises more than 18% by weight, preferably at least 20.5% by weight, particularly preferably at least 21% by weight, of $Al_{O3}$.

A further feature of the invention resides broadly in the aluminoborosilicate glass characterized in that the glass comprises more than 8% by weight of $B_2O_3$.

Another feature of the invention resides broadly in the aluminoborosilicate glass characterized in that it additionally comprises: $ZrO_2$ 0–2; $TiO_2$ 0–2; with $ZrO_2+TiO_2$ 0–2; $As_2O_3$ 0–1.5; $Sb_2O_3$ 0–1.5; $SnO_2$ 0–1.5; $CeO_2$ 0–1.5; $Cl^-$ 0–1.5; $F^-$ 0–1.5; $SO_4^{2-}$ 0–1.5; with $AS_2O_3+Sb_2O_3+SnO_2+CeO_2+Cl^-+F^-+SO_4^{2-}$ 0–1.5.

Yet another feature of the invention resides broadly in the aluminoborosilicate glass characterized in that the glass is free of arsenic oxide and antimony oxide, apart from unavoidable impurities, and that it can be produced in a float plant.

Still another feature of the invention resides broadly in the aluminoborosilicate glass which has a coefficient of thermal expansion $\alpha_{20/300}$ of between $2.8\times10^{-6}$/K and $3.6\times10^{-6}$/K, a glass transition temperature $T_g$ of >700° C. and a density $\rho$ of <2.600 g/cm$^3$.

A further feature of the invention resides broadly in the use of the aluminoborosilicate glass as substrate glass in display technology.

Another feature of the invention resides broadly in the use of the aluminoborosilicate glass as substrate glass in thin-film photovoltaics.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign and international patent publication applications, namely, Federal Republic of Germany Patent Application No. 100 00 837.2-45, filed on Jan. 12, 2000, having inventors Dr. Ulrich PEUCHERT and Dr. Peter BRIX, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein, are hereby incorporated by reference as if set forth in their entirety herein.

The corresponding foreign and international patent publication applications, namely, Federal Republic of Germany Patent Application No. 100 00 836.4-45, filed on Jan. 12, 2000, [NHL-SCT-18] having inventors Dr. Ulrich PRUCHERT and Dr. Peter BRIX, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein, are hereby incorporated by reference as if set forth in their entirety herein.

The corresponding foreign and international patent publication applications, namely, Federal Republic of Germany Patent Application No. 100 00 838.0-45, filed on Jan. 12, 2000, [NHL-SCT-19] having inventors Dr. Ulrich PEUCHERT and Dr. Peter BRIX, as well as their published equivalents, gold other equivalents or corresponding applications, if any, in corresponding cases in the Federal Republic of Germany and elsewhere, and the references cited in any of the documents cited herein, are hereby incorporated by reference as if set forth in their entirety herein, are hereby incorporated by reference as if set forth in their entirety herein.

The corresponding foreign and international patent publication applications, namely, Federal Republic of Germany Patent Application No. 100 00 839.9-45, filed on Jan. 12, 2000, [NHL-SCT-20] having inventors Dr. Ulrich PEUCHERT and Dr. Peter BRIX, as well as their published equivalents, and other equivalents or corresponding applications, if any, in corresponding cases in the Federal Republic of Germany and elsewhere, and the references cited in any of the documents cited herein, are hereby incorporated by reference as if sew forth in their entirety herein, are hereby incorporated by reference as if set forth in their entirety herein.

The U.S. Pat. No. 5,374,595 issued on Dec. 20, 1994 to William H. Dumbaugh, Jr., et al. and entitled "High liquidus viscosity glasses for flat panel displays", and its other equivalents or corresponding applications, if any, and the references cited in any of the documents cited therein, are hereby incorporated by reference as if set forth in their entirety herein.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clauses are intended to cover the structures described herein as performing the recited function and not only structural equivalents but also equivalent structures.

Supplemental features which, for example, may possibly be incorporated in embodiments of the present invention maybe found in U.S. Pat. No. 6,096,670 issued on Aug. 1, 2000 to Lautenschläger, et al. and entitled "Alkali metal-free aluminoborosilicate glass and its use"; U.S. Pat. No. 6,074,969 issued on Jun. 13, 2000 to Naumann, et al and entitled "Earth-alkaline aluminoborosilicate glass for lamp bulbs"; U.S. Pat. No. 6,065,309 issued on May 23, 2000 to Cooper, et al. and entitled "Float processing of high-temperature complex silicate glasses and float baths used for same"; U.S. Pat. No. 6,013,310 issued on in Jan. 11, 2000 to Yaoi, et al. and entitled "Method for producing a thin film semiconductor device"; U.S. Pat. No. 6,000,241 issued on Dec. 14, 1999 to Ranade, et al. and entitled "Process for making barium containing silicate glass powders"; U.S. Pat. No. 5,985,700 issued on Nov. 16, 1999 to Moore and entitled "TFT fabrication on leached glass surface"; U.S. Pat. No. 5,952,253 issued on Sep. 14, 1999 to Dejneka, et al. and entitled "Transparent apatite glass ceramics"; U.S. Pat. No. 5,932,326 issued on Aug. 3, 1999 to Kashima, et al. and entitled "Ceramic wiring boards and method for their manufacture"; U.S. Pat. No. 5,908,703 issued on Jun. 1, 1999 to Gaschler, et al. and entitled "Alkali-free aluminoborosilicate glass and its use" also referred to above; U.S. Pat. No. 5,871,654 issued on Feb. 16, 1999 to Mannami, et al. and entitled "Method for producing a glass substrate for a magnetic disc"; U.S. Pat. No. 5,824,127 issued on Oct. 20, 1998 to Bange, et al. and entitled "Arsenic-free glasses"; U.S. Pat. No. 5,785,726 issued on Jul. 28, 1998 to Dorfeld, et al. and entitled "Method of reducing bubbles at the vessel/glass interface in a glass manufacturing system"; U.S. Pat. No. 5,770,535 issued on Jun. 23, 1998 to Brix, et al. and entitled "Alkali-free aluminoborosilicate glass and its use" also referred to above; U.S. Pat. No. 5,707,746 issued on Jan. 13, 1998 to Yaoi, et al. and entitled "Thin film transistor device with advanced characteristics by improved matching between a glass substrate and a silicon nitride layer"; U.S. Pat. No. 5:374,595 issued on Dec. 20, 1994 to Dumbaugh, Jr., et al and entitled "High liquidus viscosity glasses for flat panel displays", corresponding European Patent Application 0 607 865 A1 with date of publication of application: Jul. 27, 1994; U.S. Pat. No. 5,326,730 issued on Jul. 5, 1994 to Dumbaugh, Jr., et al. and entitled "Barium aluminosilicate glasses"; U.S. Pat. No. 5,017,434 issued on May 21, 1991 to Enloe, et al. and entitled "Electronic package comprising aluminum nitride and aluminum nitride-borosilicate glass composite"; U.S. Pat. No. 4,940,674 issued on Jul. 10, 1990 to Beall, et al. and entitled "High strength haze-free transparent glass-ceramics"; U.S. Pat. No. 4,399,015 issued on Aug. 16, 1983 to Eudo, et al. and entitled "Method for fabricating an indium tin oxide film for a transparent electrode"; U.S. Pat. No. 4,248,615 issued on Feb. 3, 1981 to Seng, et al. and entitled "Pollution abating, energy conserving glass manufacturing process"; U.S. Pat. No. 3,998,667 issued on Dec. 21, 1976 to Rapp and entitled "Barium aluminoborosilicate glass-ceramics for semiconductor doping"; U.S. Pat. No. 3,962,000 issued on Jun. 8, 1976 to Rapp and entitled "Barium aluminoborosilicate glass-ceramics for semiconductor doping"; U.S. Pat. No. 3,961,969 issued on Jun. 8, 1976 to Rapp and entitled "Glass-ceramics for semiconductor doping"; and U.S. Pat. No. 3,907,618 issued on Sep. 23, 1975 to Rapp and entitled "Process for doping semiconductor employing glass-ceramic dopant".

Examples of twisted nematic and/or super twisted nematic displays in which may possibly be incorporated embodiments of the present invention may be found in U.S. Pat. No. 6,023,317 issued on Feb. 8, 2000 to Xu, et al. and entitled "Normally white twisted nematic LCD with positive and negative retarders"; U.S. Pat. No. 5,859,681 issued on Jan. 12, 1999 to VanderPloeg, et al. and entitled "Normally white twisted nematic LCD with positive uniaxial and negative biaxial retarders having $N_x>N_y>N_2$"; U.S. Pat. No. 5,818,615 issued on Oct. 6, 1998 to Abileah, et al. and entitled "Liquid crystal display with patterned retardation films"; U.S. Pat. No. 5,694,187 issued on Dec. 2, 1997 to Abileah, et al. and entitled "LCD including negative biaxial retarder on each side of the liquid crystal layer"; U.S. Pat. No. 5,657,140 issued on Aug. 12, 1997 to Xu, et al. and entitled "Normally white twisted nematic LCD with positive and negative retarders"; U.S. Pat. No. 5,576,855 issued on Nov. 19, 1996 to Swirbel, et al. and entitled "Liquid crystal display having embossed appearing characters"; and U.S. Pat. No. 3,975,286 issued on Aug. 17, 1976 to Oh and entitled "Low voltage actuated field effect liquid crystals compositions and method of synthesis".

Examples of active matrix liquid crystal displays (AMLCDs) in which may possibly be incorporated embodiments of the present invention may be found in U.S. Pat. No. 6,146,930 issued on Nov. 14, 2000 to Kobayashi, et al. and entitled "Method of fabricating and active-matrix liquid crystal display"; U.S. Pat. No. 6,140,990 issued on Oct. 31, 2000 to Schlig and entitled "Active matrix liquid crystal display incorporating pixel inversion with reduced drive pulse amplitudes"; U.S. Pat. No. 6,137,558 issued on Oct. 24, 2000 to Koma, et al. and entitled "Active-matrix liquid crystal display"; U.S. Pat. No. 6,091,473 issued on Jul. 18, 2000 to Hebiguchi and entitled "Active matrix liquid crystal display"; U.S. Pat. No. 6,075,580 issued on Jun. 13, 2000 to Kouchi and entitled "Active matrix. type liquid crystal display apparatus with conductive light shield element"; U.S. Pat. No. 6,052,168 issued on Apr. 18, 2000 to Nishida, et al. and entitled "Active matrix liquid-crystal display with verticle alignment, positive anisotropy and opposing electrodes below pixel electrode"; U.S. Pat. No. 6,040,813 issued on Mar. 21, 2000 to Takubo and entitled "Active matrix liquid crystal display device and a method for driving the same"; U.S. Pat. No. 6,028,578 issued on Feb. 22, 2000 to Ota, et al. and entitled "Active matrix type liquid crystal display system and driving method therefor"; U.S. Pat. No. 5,990,998 issued on Nov. 23, 1999 to Park, et al. and entitled "Active matrix liquid crystal display and related method"; U.S. Pat. No. 5,880,794 issued on Mar. 9, 1999 to Hwang and entitled "Active matrix liquid crystal display and method with two anodizations"; U.S. Pat. No. 5,861,326 issued on Jan. 19, 1999 to Yamazaki, et al. and entitled "Method for manufacturing semiconductor integrated circuits; U.S. Pat. No. 5,808,410 issued on Sep. 15, 1998 to Pinker, et al. and entitled "Flat panel light source for liquid crystal displays"; U.S. Pat. No. 5,767,930 issued to Kobayashi, et al. and entitled "Active-matrix liquid-crystal display and fabrication method thereof"; U.S. Pat. No. 5,739,180 issued on Apr. 14, 1998 to Taylor-Smith and entitled "Flat-panel displays and methods and substrates therefor"; U.S. Pat. No. 5,650,865 issued on Jul. 22, 1997 to Smith and entitled "Holographic backlight for flat panel displays"; U.S. Pat. No. Re 35,416 reissued on Dec. 31, 1996 to Suzuki, et al. and entitled "Active matrix liquid crystal display device and method for production thereof"; U.S. Pat. No. 5,546,204 issued on Aug. 13, 1996 to Ellis and entitled "TFT matrix liquid crystal device having data source lines and drain means of etched and doped single crystal silicon"; U.S. Pat. No. 5,493,986 issued on Feb. 27, 1996 to Augusto and entitled "Method of providing VLSI-quality crystalline semiconductor substrates; U.S. Pat. No. 5,465,052 issued on Nov. 7, 1995 to Henley and entitled "Method of testing liquid crystal display substrates"; U.S. Pat. No. 5,184,236 issued on Feb. 2, 1993 to Miyashita, et. al. and entitled "Twisted nematic liquid crystal display device with retardation plates having phase axis direction with 15° of alignment direction"; U.S. Pat. No. 5,182,661 issued on Jan. 26, 1993 to Ikeda, et al. and entitled "Thin film field effect transistor array for use in active matrix liquid crystal display"; and U.S. Pat. No. 5,084,905 issued on Jan. 28, 1992 to Sasaki, et al. and entitled "Thin film transistor panel and manufacturing method thereof".

Examples of thin film transistors (TFT) displays in which may possibly be incorporated embodiments of the present invention may be found in U.S. Pat. No. 6,087,678 issued on Jul. 11, 2000 to Kim and entitled "Thin-film transistor display devices having composite electrodes"; U.S. Pat. No. 6,005,646 issued on Dec. 21, 1999 to Nakamura, et al. and entitled "Voltage application driving method"; U.S. Pat. No. 5,920,362 issued on Jul. 6, 1999 to Lee and entitled "Method of forming thin-film transistor liquid crystal display having a silicon active layer contacting a sidewall of a data line and a storage capacitor electrode"; U.S. Pat. No. 5,920,083 issued on Jul. 6, 1999 to Bae and entitled "Thin-film transistor display devices having coplanar gate and drain lines"; U.S. Pat. No. 5,917,564 issued on Jun. 29, 1999 and entitled "Methods of forming active matrix display devices with reduced susceptibility to image-sticking and devices formed thereby"; U.S. Pat. No. 5,619,357 issued on Apr. 8, 1997 to Angelopoulos, et al. and entitled "Flat panel display containing black matrix polymer"; U.S. Pat. No. 5,317,433 issued on May 31, 1994 to Miyawaki, et al. and entitled "Image display device with a transistor on one side of insulating layer and liquid crystal on the other side"; U.S. Pat. No. 5,250,937 issued on Oct. 5, 1993 to Kikuo, et al. and entitled "Half tone liquid crystal display circuit with an A.C. voltage divider for drivers"; U.S. Pat. No. 5,233,448 issued on Aug. 3, 1993 to Wu and entitled "Method of manufacturing a liquid crystal display panel including photoconductive electrostatic protection"; U.S. Pat. No. 4,723,838 issued on Feb. 9, 1988 to Aoki, et al. and entitled "Liquid crystal display device"; and U.S. Pat. No. 4,404,578 issued on Sep. 13, 1983 to Takafuji, et al. and entitled "Structure of thin film transistors".

Examples of plasma addressed liquid crystals (PALCs) displays in which may possibly be incorporated embodiments of the present invention may be found in U.S. Pat. No. 6,094,183 issued on Jul. 25, 2000 to Tanamachi, et al. and entitled "Plasma addressed liquid crystal display device"; U.S. Pat. No. 6,081,245 issued on Jun. 27, 2000 to Abe and entitled "Plasma-addressed liquid-crystal display device"; U.S. Pat. No. 5,997,379 issued on Dec. 7, 1999 to Kimura and entitled "Method of manufacturing plasma addressed liquid crystal display"; U.S. Pat. No. 5,984,747 issued on Nov. 16, 1999 to Bhagavatula, et al. and entitled "Glass structures for information displays"; U.S. Pat. No. 5,886,467 issued on Mar. 23, 1999 to Kimura and entitled "Plasma addressed liquid crystal display device"; U.S. Pat. No. 5,844,639 issued on Dec. 1, 1998 to Togawa and entitled "Plasma addressed liquid crystal display device"; U.S. Pat. No. 5,810,634 issued on Sep. 22, 1998 to Miyazaki, et al. and entitled "Method of manufacturing a plasma addressed liquid crystal display device"; U.S. Pat. No. 5,757,342 issued on May 26, 1998 to Hayashi and entitled "Plasma addressed liquid crystal display device"; U.S. Pat. No. 5,725,406 issued on Mar. 10, 1998 to Togawa and entitled "Plasma addressed display device"; U.S. Pat. No. 5,698,944 issued on Dec. 16, 1997 to Togawa and entitled "Plasma addressed liquid crystal display device"; U.S. Pat. No. 5,526,151 issued on Jun. 11, 1996 to Miyazaki, et al. and entitled "Method of manufacturing a plasma addressed liquid crystal display device having planarized barrier ribs"; U.S. Pat. No. 5,499,122 issued on Mar. 12, 1996 to Yano and entitled "Plasma-addressed liquid crystal display device having a transparent dielectric sheet with a porous layer containing an impregnated liquid crystal"; U.S. Pat. No. 5,383,040 issued on Jan. 17, 1995 to Kim and entitled "Plasma addressed liquid crystal display with center substrate divided into separate sections"; U.S. Pat. No. 5,377,029 issued on Dec. 27, 1994 to Lee, et al. and entitled "Plasma addressed liquid crystal display"; and U.S. Pat. No. 5,221,979 issued on Jun. 22, 1993 to Kim and entitled "Plasma addressed liquid crystal display and manufacturing method".

The details in the patents, patent applications and publications may be considered to be incorporable, at Applicants' option, into the claims during prosecution as further limitations in the claims to patentably distinguish any amended claims from any applied prior art.

Examples of thin-film photovoltaic apparatus and methods of making them in which may possibly be incorporated embodiments of the present invention may be found in U.S. Pat. No. 6,137,048 issued on Oct. 24, 2000 to Wu, et al. and entitled "Process for fabricating polycrystalline semiconductor thin-film solar cells, and cells produced thereby"; U.S. Pat. No. 5,922,142 issued on Jul. 13, 1999 to Wu, et al.

and entitled "Photovoltaic devices comprising cadmium stannate transparent conducting films and method for making"; U.S. Pat. No. 5,503,898 issued on Apr. 2, 1996 to Lauf and entitled "Method for producing textured substrates for thin-film photovoltaic cell"; U.S. Pat. No. 5,378,639 issued on Jan. 3, 1995 to Sasaki, et al. and entitled "Method for manufacturing a thin-film photovoltaic conversion device"; U.S. Pat. No. 5,306,646 issued on Apr. 26, 1994 to Lauf and entitled "Method for producing textured substrates for thin-film photovoltaic cells". U.S. Pat. No. 5,057,163 issued on Oct. 15, 1991 to Barnett et al. and entitled "Deposited-silicon film solar cell"; U.S. Pat. No. 4,772,564 issued on Sep. 20, 1988 to Barnett, et al. and entitled "Fault tolerant thin-film photovoltaic cell fabrication Process"; U.S. Pat. No. 4,677,250 issued on Jun. 30, 1987 to Barnett, et al. and entitled "Fault tolerant thin-film photovoltaic cell"; U.S. Pat. No. 4,647,711 issued on Mar. 3, 1987 to Basol, et al. and entitled "Stable Lront contact current collectors for photovoltaic devices and method of making same"; U.S. Pat. No. 4,604,791 issued on Aug. 12, 1986 to Todorof and entitled "Method for producing multi-layer, thin-film, flexible silicon alloy photovoltaic cells"; and U.S. Pat. No. 4,595,790 issued on Jun. 17, 1986 to Basol and entitled "Method of making current collector grid and materials therefor".

Examples of processing technology which may possibly be incorporated in embodiments of the present invention may be found in U.S. Pat. No. 5,766,296 issued on Jun. 16, 1998 to Moreau and entitled "Furnace for melting glass and method for using glass produced therein"; U.S. Pat. No. 5,764,415 issued on Jun. 9, 1998 to Nelson, et al. and entitled "Coatings on glass"; U.S. Pat. No. 5,057,140 issued on Oct. 15, 1991 to Nixon and entitled "Apparatus for melting glass batch material"; U.S. Pat. No. 5,054,355 issued on Oct. 8, 1991 to Tisse, et al. and entitled "Automatic glass cutting and positioning system"; U.S. Pat. No. 4,781,742 issued on Nov. 1, 1988 to Hill, et al. and entitled "Method and apparatus for detecting unwanted materials among cullet"; U.S. Pat. No. 4,489,870 issued on Dec. 25. 1984 to Prange, et al. and entitled "Apparatus for severing edges of a glass sheet"; and U.S. Pat. No. Re 30,147 reissued on Nov. 13, 1979 to Jordan, et al. and entitled "Method of coating a glass ribbon on a liquid float bath".

This invention as described hereinabove in the context of the preferred embodiments is not to be taken as limited to all of the provided details thereof, since modifications and variations thereof may be made without departing from the spirit and scope of the invention.

What is claimed is:

1. A glass comprising:

a substantially alkali-free aluminoborosilicate glass;

said glass having the composition (in % by weight, based on oxide):

| | |
|---|---|
| $SiO_2$ | >58 – 65 |
| $B_2O_3$ | >6 – 11.5 |
| $Al_2O_3$ | >14 – 25 |
| MgO | 4 – 8 |
| CaO | 0 – 8 |
| SrO | 2.6 – <4 |
| BaO | 0 – <0.5 |
| with SrO + BaO | >3 |
| ZnO | 0.5 – 2; | said composition of said $SiO_2$, said $B_2O_3$, said $Al_2O_3$, said MgO, said CaO, said SrO, said BaO, said SrO+BaO, and said ZnO being selected to provide all of (i.), (ii.), (iii.), and (iv.), wherein (i.), (ii.), (iii.), and (iv.) comprise:

(i.) a coefficient of thermal expansion $\alpha_{20/300}$ of between $2.8 \times 10^{-6}$/K and $3.8 \times 10^{-6}$/K;

(ii.) a glass transition temperature, $T_g$, of more than 713 degrees Celsius to maximize heat resistance of said glass;

(iii.) a temperature at a viscosity of $10^2$ dPas of at most 1694 degrees Celsius; and (iv.) a processing temperature, $V_A$, at a viscosity of $10^4$ dPas of at most 1273 degrees Celsius.

2. The glass according to claim 1, wherein:

said glass contains from more than 8% by weight to 11.5% by weight of $B_2O_3$.

3. The glass according to claim 2, comprising all of (a.), (b.), (c.), (d.), (e.), (f.), and (g.), wherein (a.), (b.), (c.), (d.), (e.), (f.), and (g.) comprise:

(a.) one of (i.), (ii.), and (iii.):

(i.) more than 18% by weight of $Al_2O_3$;

(ii.) at least 20.5% by weight of $Al_2O_3$; and (iii.) at least 21% by weight of $Al_2O_3$;

(b.) one of (i.) and (ii.):

(i.) a glass containing additionally (in % by weight):

| | |
|---|---|
| $ZrO_2$ | 0–2 |
| $TiO_2$ | 0–2 |
| with $ZrO_2$ + $TiO_2$ | 0–2 |
| $As_2O_3$ | 0–1.5 |
| $Sb_2O_3$ | 0–1.5 |
| $SnO_2$ | 0–1.5 |
| $CeO_2$ | 0–1.5 |
| $Cl^-$ | 0–1.5 |
| $F^-$ | 0–1.5 |
| $SO_4^{2-}$ | 0–1.5 | with $As_2O_3 + Sb_2O_3 + SnO_2 + CeO_2 + Cl^- + F^- + SO_4^{2-}$ 0–1.5; and (ii.) a glass minimized in $ZrO_2$, $SnO_2$, $TiO_2$, and $CeO_2$;

(c.) a glass in which arsenic oxide, antimony oxide, and inherent impurities are minimized;

(d.) said glass comprises a float glass;

(e.) a density, $\rho$, of <2.600 g/cm$^3$;

(f.) all of (i.), (ii.), and (iii.):

(i.) said glass is resistant to thermal shock;

(ii.) said glass has a high transparency over a broad spectral range in the visible and ultra violet ranges; and (iii.) glass is free of bubbles, knots, inclusions, streaks, and surface undulations; and (g.) said glass comprises a glass substrate for a flat panel liquid-crystal display, such as, for a laptop computer, the flat panel liquid-display including a twisted nematic display, a supertwisted nematic display, an active matrix liquid-crystal display, a thin film transistor display, and a plasma addressed liquid-crystal display.

* * * * *

UNITED STATES PATENT AND TRADEMARK OFFICE
CERTIFICATE OF CORRECTION

PATENT NO.   : 6,867,158 B2
DATED        : March 15, 2005
INVENTOR(S)  : Ulrich Peuchert and Peter Brix It is certified that error appears in the above-identified patent and that said Letters Patent is hereby corrected as shown below:

Column 1,
Line 49, after "$\alpha_{20/300}$", delete "$\equiv$" and insert -- $\cong$ --.
Line 67, after "thin", delete "($\succ$1" and insert -- ($\prec$1 --.

Column 2,
Line 12, before "1350°", delete "s" and insert -- $\preceq$ --.

Column 3,
Line 61, after the first occurrence of "4%" delete "(2.6%-4%);" and insert -- (2.6%-$\prec$4%); --.
Line 65, after "(0%-2%)" insert -- . --.

Column 4,
Line 1, after "and", delete "3.8" and insert -- 3.4 --.

Column 5,
Line 18, after "minimum", delete "Bum" and insert -- sum --.
Line 59, after "Low", delete "$Zro_2$" and insert $ZrO_2$ --.

Column 6,
Line 4, after "of", delete "$Cl^{31}$" and insert -- $Cl^-$ --.
Line 36, after "follows" delete "Working" and insert --  . --.
Line 37, before "example" insert "Working".

Column 7,
The last number in column 5 of Table, delete "10.66" and insert -- 0.66 --.

Column 9,
Line 52, after "and", delete "3.8x10$^-$" and insert -- 3.8x10$^{-6}$/K, --.
Line 53, before "which" delete "$_6$/K,"
Line 67, before "which", delete "$10^6$/K," and insert -- $10^{-6}$/K, --.

Column 10,
Line 8, delete "$Al_{03}$." and insert -- $Al_2O_3$. --.

Column 11,
Line 3, after "equivalents", delete "gold" and insert -- and --.
Line 19, after "if", delete "sew" and insert -- set --.

UNITED STATES PATENT AND TRADEMARK OFFICE
CERTIFICATE OF CORRECTION

PATENT NO. : 6,867,158 B2
DATED : March 15, 2005
INVENTOR(S) : Ulrich Peuchert and Peter Brix It is certified that error appears in the above-identified patent and that said Letters Patent is hereby corrected as shown below:

Column 12,
Line 10, after "No." delete "5:374,595" and insert -- 5,374,595 --.

Column 15,
Line 18, after ""Stable", delete "Lront" and insert -- front --.

Column 16,
Lines 23, 24 and 25 after "of", delete "Al2O3;" and insert -- $Al_2O_3$; --.

Signed and Sealed this

Twenty-eighth Day of June, 2005

JON W. DUDAS
*Director of the United States Patent and Trademark Office*